(12) United States Patent
Hu et al.

(10) Patent No.: US 9,720,180 B2
(45) Date of Patent: Aug. 1, 2017

(54) MULTICAST OPTICAL SWITCH BASED ON FREE-SPACE TRANSMISSION

(71) Applicant: Accelink Technologies Co., Ltd., Wuhan (CN)

(72) Inventors: Qianggao Hu, Wuhan (CN); Liping Sun, Wuhan (CN); Bo Zhang, Wuhan (CN); Leilei Hu, Wuhan (CN); Liu Yang, Wuhan (CN); Hui Xie, Wuhan (CN); Rui Yang, Wuhan (CN); Zhilin Yuan, Wuhan (CN); Yuan Zhang, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 15/037,427

(22) PCT Filed: Nov. 25, 2013

(86) PCT No.: PCT/CN2013/087756
§ 371 (c)(1),
(2) Date: May 18, 2016

(87) PCT Pub. No.: WO2015/074266
PCT Pub. Date: May 28, 2015

(65) Prior Publication Data
US 2016/0291255 A1    Oct. 6, 2016

(30) Foreign Application Priority Data

Nov. 19, 2013  (CN) .......................... 2013 1 0583128

(51) Int. Cl.
*G02B 6/35* (2006.01)
*G02B 6/32* (2006.01)

(52) U.S. Cl.
CPC ............. *G02B 6/3556* (2013.01); *G02B 6/32* (2013.01); *G02B 6/3518* (2013.01); *G02B 6/3548* (2013.01); *G02B 6/3592* (2013.01)

(58) Field of Classification Search
CPC ...... G02B 6/3556; G02B 6/32; G02B 6/3518; G02B 6/3548; G02B 6/3592; G02B 6/35
See application file for complete search history.

(56) References Cited

U.S. PATENT DOCUMENTS 4,896,934 A * 1/1990 Arthurs .................. H04L 12/28
                                                                  385/16
5,005,167 A * 4/1991 Arthurs .................. H04L 12/28
                                                                  398/54

(Continued)

FOREIGN PATENT DOCUMENTS

CN        1762177 A     4/2006
CN        1797062 A     7/2006

(Continued)

OTHER PUBLICATIONS

International Search Report for Application PCT/CN2013/087756 dated Aug. 5, 2014.

*Primary Examiner* — Andrew Jordan
(74) *Attorney, Agent, or Firm* — Lerner, David, Littenberg, Krumholz & Mentlik, LLP

(57) ABSTRACT

A multicast optical switch based on free-space transmission comprises a 1×M input collimator array, a light splitting device, an optical distance compensation device, a spot transformation device, a 1×N output collimator array and a reflector array which are arranged in sequence. The 1×N output collimator array corresponds to reflector array. The light splitting device is provided with a light splitting surface and a reflection surface, and by means of light splitting surface and reflection surface, light splitting and beam splitting of n times are carried out on input signals of 1×M (Continued)

input collimator array, and then N beams of sub-signal light are generated. The optical distance compensation device compensates optical distance differences among M×N sub-signal light beams produced by light splitting device. The M×N sub-signal light beams are focused to be 1×N light spots through light spot conversion device, and then 1×N light spots are reflected to reflector array.

16 Claims, 3 Drawing Sheets

(56) References Cited

U.S. PATENT DOCUMENTS

| | | | | |
|---|---|---|---|---|
| 5,093,743 A * | 3/1992 | Eng | H04Q 11/0001 | 398/51 |
| 5,124,978 A * | 6/1992 | Chao | H04J 3/247 | 370/422 |
| 5,130,984 A * | 7/1992 | Cisneros | H04L 12/5601 | 370/399 |
| 5,157,654 A * | 10/1992 | Cisneros | H04L 12/5601 | 370/414 |
| 5,166,926 A * | 11/1992 | Cisneros | H04L 12/5601 | 370/392 |
| 5,179,552 A * | 1/1993 | Chao | H04J 3/247 | 370/352 |
| 5,197,064 A * | 3/1993 | Chao | H04J 3/247 | 370/398 |
| 5,301,055 A * | 4/1994 | Bagchi | H04L 49/203 | 370/395.4 |
| 5,303,078 A * | 4/1994 | Brackett | H04L 12/5601 | 370/395.31 |
| 5,455,701 A * | 10/1995 | Eng | H04L 12/5601 | 398/51 |
| 5,663,818 A * | 9/1997 | Yamamoto | H04Q 11/0001 | 398/1 |
| 6,005,698 A * | 12/1999 | Huber | H04Q 11/0005 | 385/17 |
| 6,429,955 B1 * | 8/2002 | Suemura | H04Q 11/0001 | 398/48 |
| 6,442,694 B1 * | 8/2002 | Bergman | H04L 41/0654 | 709/224 |
| 6,445,473 B1 * | 9/2002 | Suemura | H04Q 11/0005 | 398/48 |
| 6,538,784 B1 * | 3/2003 | Lee | H04Q 11/0005 | 398/82 |
| 6,661,789 B1 * | 12/2003 | Cankaya | H04L 45/00 | 370/390 |
| 6,674,966 B1 * | 1/2004 | Koonen | H04B 10/25752 | 370/318 |
| 6,754,449 B2 * | 6/2004 | Chang | H04Q 11/0062 | 370/390 |
| 6,754,450 B2 * | 6/2004 | Chang | H04Q 11/0062 | 370/390 |
| 6,757,495 B2 * | 6/2004 | Chang | H04J 14/0227 | 370/390 |
| 6,757,496 B2 * | 6/2004 | Chang | H04Q 11/0005 | 370/390 |
| 6,757,497 B2 * | 6/2004 | Chang | H04Q 11/0062 | 370/390 |
| 6,760,549 B2 * | 7/2004 | Chang | H04Q 11/0066 | 370/390 |
| 6,766,114 B2 * | 7/2004 | Chang | H04Q 11/0062 | 370/390 |
| 6,768,871 B2 * | 7/2004 | Chang | H04Q 11/0062 | 370/390 |
| 6,813,276 B2 * | 11/2004 | Chang | H04Q 11/0062 | 370/432 |
| 6,819,666 B2 * | 11/2004 | Chang | H04J 14/0227 | 370/352 |
| 6,850,515 B2 * | 2/2005 | Chang | H04J 14/0227 | 370/352 |
| 6,850,707 B1 * | 2/2005 | Chang | H04J 14/0227 | 370/390 |
| 6,873,797 B2 * | 3/2005 | Chang | H04L 12/1836 | 370/390 |
| 6,879,745 B2 * | 4/2005 | Okayama | G02B 6/32 | 385/16 |
| 6,934,472 B2 * | 8/2005 | Chang | H04Q 11/0062 | 370/390 |
| 7,027,733 B2 * | 4/2006 | Feuer | H04Q 11/0005 | 398/45 |
| 7,039,316 B2 * | 5/2006 | Chang | H04J 14/0227 | 398/183 |
| 7,106,977 B1 * | 9/2006 | Dasylva | H04Q 11/0005 | 398/182 |
| 7,263,252 B2 * | 8/2007 | Nakano | H04Q 11/0005 | 385/16 |
| 7,302,176 B2 * | 11/2007 | Sakano | H04B 10/032 | 398/148 |
| 7,308,197 B1 * | 12/2007 | Zhong | H04J 14/0204 | 398/48 |
| 7,366,417 B2 * | 4/2008 | Feuer | H04Q 11/0005 | 385/16 |
| 7,373,091 B2 * | 5/2008 | Moeller | H04B 10/60 | 250/214 A |
| 7,436,580 B2 * | 10/2008 | McKinstrie | G02F 1/3536 | 359/326 |
| 7,440,648 B2 * | 10/2008 | Oikawa | H04Q 11/0005 | 385/16 |
| 7,447,399 B2 * | 11/2008 | Aota | G02B 6/2931 | 385/15 |
| 7,471,703 B2 * | 12/2008 | del Rio Herrero | H04B 7/18584 | 370/535 |
| 7,499,652 B2 * | 3/2009 | Zhong | H04J 14/0204 | 398/48 |
| 7,505,192 B1 * | 3/2009 | Zhao | G02F 1/093 | 359/281 |
| RE41,063 E * | 12/2009 | Chang | H04J 14/0227 | 398/183 |
| 7,634,582 B2 * | 12/2009 | Ovadia | H04L 29/06 | 709/249 |
| 7,675,870 B2 * | 3/2010 | Chun | H04J 3/1617 | 370/255 |
| 7,697,843 B2 * | 4/2010 | Zhong | H04J 14/0204 | 398/48 |
| 7,751,710 B2 * | 7/2010 | Chung | H04J 14/0204 | 398/48 |
| 7,899,334 B2 * | 3/2011 | Zhong | H04J 14/0204 | 398/157 |
| 8,330,088 B2 * | 12/2012 | Jennings | F41G 7/002 | 250/203.1 |
| 8,411,681 B2 * | 4/2013 | Chun | H04J 14/0227 | 370/390 |
| 8,447,183 B2 * | 5/2013 | Boduch | H04J 14/0201 | 398/83 |
| 8,457,497 B2 * | 6/2013 | Zhong | H04J 14/0204 | 385/16 |
| 8,582,967 B2 * | 11/2013 | Vojtech | H04Q 11/0005 | 398/45 |
| 8,731,403 B2 * | 5/2014 | Martinelli | G02B 6/3512 | 398/49 |
| 8,891,914 B2 * | 11/2014 | Ticknor | G02B 6/35 | 385/17 |
| 9,002,160 B2 * | 4/2015 | Colbourne | G02B 6/3518 | 385/17 |
| 9,069,139 B2 * | 6/2015 | McLaughlin | G02B 6/3518 | |
| 9,077,482 B2 * | 7/2015 | Winzer | H04J 14/0201 | |
| 9,099,833 B2 * | 8/2015 | Mitchell | H04J 14/0201 | |
| 9,110,317 B1 * | 8/2015 | Kemmet Oster | G02F 1/0955 | |
| 9,158,072 B2 * | 10/2015 | Frisken | G02B 6/3518 | |
| 9,250,391 B2 * | 2/2016 | McLaughlin | G02B 6/3518 | |
| 9,252,910 B2 * | 2/2016 | Roorda | H04J 14/0212 | |
| 9,363,581 B2 * | 6/2016 | Fondeur | H04Q 11/0005 | |
| 9,414,135 B2 * | 8/2016 | Patel | H04Q 11/0005 | |
| 9,429,712 B2 * | 8/2016 | Martinelli | G02B 6/3546 | |
| 9,497,519 B2 * | 11/2016 | Xu | H04Q 11/0005 | |
| 9,563,021 B2 * | 2/2017 | Moidu | G02B 6/3582 | |

(56) References Cited

U.S. PATENT DOCUMENTS

| | | | |
|---|---|---|---|
| 9,581,765 B2* | 2/2017 | Way | G02B 6/3546 |
| 2001/0026384 A1* | 10/2001 | Sakano | H04B 10/032 398/79 |
| 2002/0057862 A1* | 5/2002 | Okayama | G02B 6/32 385/17 |
| 2002/0114030 A1* | 8/2002 | Dwivedi | H04J 14/02 398/66 |
| 2002/0131117 A1* | 9/2002 | Feuer | H04Q 11/0005 398/79 |
| 2002/0141014 A1* | 10/2002 | Chang | H04Q 11/0066 398/70 |
| 2002/0141015 A1* | 10/2002 | Chang | H04Q 11/0062 398/98 |
| 2002/0141017 A1* | 10/2002 | Chang | H04Q 11/0062 398/101 |
| 2002/0141018 A1* | 10/2002 | Chang | H04Q 11/0062 398/101 |
| 2002/0141019 A1* | 10/2002 | Chang | H04Q 11/0062 398/101 |
| 2002/0141408 A1* | 10/2002 | Chang | H04J 14/0227 370/390 |
| 2002/0141409 A1* | 10/2002 | Chang | H04L 12/1836 370/390 |
| 2002/0145783 A1* | 10/2002 | Chang | H04J 14/0227 398/70 |
| 2002/0145785 A1* | 10/2002 | Chang | H04Q 11/0005 398/98 |
| 2002/0145786 A1* | 10/2002 | Chang | H04Q 11/0062 398/98 |
| 2002/0146006 A1* | 10/2002 | Chang | H04J 14/0227 370/390 |
| 2002/0146007 A1* | 10/2002 | Chang | H04J 14/0227 370/390 |
| 2002/0146027 A1* | 10/2002 | Chang | H04Q 11/0005 370/432 |
| 2002/0146028 A1* | 10/2002 | Chang | H04Q 11/0062 370/432 |
| 2003/0117678 A1* | 6/2003 | Chang | H04Q 11/0062 398/49 |
| 2004/0126112 A1* | 7/2004 | Kim | H04J 14/0227 398/51 |
| 2004/0146299 A1* | 7/2004 | Clapp | H04J 14/0227 398/49 |
| 2004/0213229 A1* | 10/2004 | Chang | H04J 14/0227 370/390 |
| 2004/0213564 A1* | 10/2004 | Sakano | H04B 10/032 398/12 |
| 2005/0069333 A1* | 3/2005 | Moeller | H04B 10/64 398/202 |
| 2006/0153563 A1* | 7/2006 | Feuer | H04Q 11/0005 398/45 |
| 2008/0002974 A1* | 1/2008 | Zhong | H04J 14/0204 398/48 |
| 2008/0080499 A1* | 4/2008 | Chun | H04J 3/1617 370/389 |
| 2008/0080861 A1* | 4/2008 | Chung | H04J 14/0204 398/56 |
| 2008/0158656 A1* | 7/2008 | McKinstrie | G02F 1/3536 359/330 |
| 2009/0016717 A1* | 1/2009 | Zhong | H04J 14/0204 398/51 |
| 2009/0067845 A1* | 3/2009 | Zhong | H04J 14/0204 398/83 |
| 2010/0129082 A1* | 5/2010 | Zhong | H04J 14/0204 398/83 |
| 2010/0142380 A1* | 6/2010 | Chun | H04J 14/0227 370/241.1 |
| 2010/0272441 A1* | 10/2010 | Boduch | H04J 14/0206 398/83 |
| 2010/0310254 A1* | 12/2010 | Vojtech | H04Q 11/0005 398/45 |
| 2011/0019154 A1* | 1/2011 | Jennings | F41G 7/002 353/11 |
| 2011/0164876 A1* | 7/2011 | Fujita | H04J 14/0204 398/48 |
| 2013/0108215 A1* | 5/2013 | Ticknor | G02B 6/35 385/17 |
| 2013/0202297 A1* | 8/2013 | Martinelli | G02B 6/3512 398/49 |
| 2013/0209030 A1* | 8/2013 | Colbourne | G02B 6/3518 385/17 |
| 2013/0209031 A1* | 8/2013 | McLaughlin | G02B 6/3518 385/17 |
| 2014/0161454 A1* | 6/2014 | Roorda | H04J 14/0212 398/68 |
| 2014/0254982 A1* | 9/2014 | Frisken | G02B 6/3518 385/17 |
| 2014/0270760 A1* | 9/2014 | Xu | H04Q 11/0005 398/45 |
| 2014/0294344 A1* | 10/2014 | Fondeur | H04Q 11/0005 385/17 |
| 2015/0036971 A1* | 2/2015 | Way | G02B 6/35 385/17 |
| 2015/0098700 A1* | 4/2015 | Zhu | H04Q 11/0005 398/48 |
| 2015/0131992 A1* | 5/2015 | Lee | H04B 10/275 398/48 |
| 2015/0181316 A1* | 6/2015 | Patel | H04Q 11/0005 398/45 |
| 2015/0188276 A1* | 7/2015 | Mitchell | H04J 14/0201 359/337.21 |
| 2015/0244492 A1* | 8/2015 | Lee | H04J 14/0212 398/48 |
| 2015/0260921 A1* | 9/2015 | Moidu | G02B 6/3582 385/16 |
| 2015/0293307 A1* | 10/2015 | McLaughlin | G02B 6/3518 385/17 |
| 2016/0025934 A1* | 1/2016 | Martinelli | G02B 6/3546 398/49 |
| 2016/0109669 A1* | 4/2016 | Moidu | G02B 6/4267 385/16 |
| 2016/0227300 A1* | 8/2016 | Lai | H04Q 11/0005 |
| 2016/0270031 A1* | 9/2016 | Sundaresan | H04W 28/0236 |
| 2016/0291255 A1* | 10/2016 | Hu | G02B 6/3518 |
| 2016/0315697 A1* | 10/2016 | Breukelaar | H04J 14/0212 |

FOREIGN PATENT DOCUMENTS

| | | |
|---|---|---|
| CN | 1831574 A | 9/2006 |
| EP | 2028511 A1 | 2/2009 |
| WO | 02056521 A1 | 7/2002 |

\* cited by examiner

MULTICAST OPTICAL SWITCH BASED ON FREE-SPACE TRANSMISSION

CROSS-REFERENCE TO RELATED APPLICATIONS

The present application is a national phase entry under 35 U.S.C §371 of International Application No. PCT/CN2013/087756 filed Nov. 25, 2013, which claims priority from Chinese Application No. 201310583128.0 filed Nov. 19, 2013, all of which are hereby incorporated herein by reference.

TECHNICAL FIELD

Embodiment of the present invention relates to an optical switch, and more particularly to an optical switch with multicast exchange function, belongs to field of optical fiber communication.

TECHNICAL BACKGROUND

Multicast optical switch is a wavelength-independent optical device. It can divide one input optical signal into multiple output optical signals, and transmits them to different ports. As one of key devices of the next generation of ROADM (reconfigurable optical add-drop multiplexer) system, the multicast optical switch cooperate is used with wavelength-selection optical switch. It is possible to meet function requirements of the ROADM system of colorlessness, non-directionality and non-competitiveness, that is significant to increase flexibility and reduce cost of the network construction.

Currently, there are three implementation methods of multicast optical switch, i.e., splicing method, integrated method and free space method. For multicast optical switch in manner of splicing using planar lightwave circuit (PLC) splitter and light switch, ports between the splitter and the light switch need to be connected with optical path by using a lot of optical fibers, and with increase of the ports, assembly difficulty and volume will increase; For multicast optical switch in manner of integration using PLC integrated splitter and switch, technical difficulty thereof is high, and requirement on equipment is high, and control principle of the PLC switch itself will cause larger power consumption US Patent application US2013/0202297 related to two kinds of free space solutions, one of which is to use the PLC splitter plus reflector or reflector array to create multicast optical switch in manner of free space. It needs to use a lot of lens for transformation of spots of the PLC splitter, with high debugging difficulty and high cost; the other solution is to use mirror array which consists of reflectors with different reflectivities to realize function of the splitter. Because reflectivity of each reflector is different, assembly complexity and cost thereof is higher than those of the first solution. And there is a problem of interference existing in optical path disclosed in the patent application, in when there are multiple inputting ports, the inputting ports may be interfered by reflected light.

SUMMARY OF INVENTION

An object of embodiment of the present invention is to overcome the technical defects existing in the prior art and to provide an optical switch with multicast exchange function.

Embodiment of the present invention provided a multicast optical switch device, comprising M input ports, a light splitting device for producing M×N beams, a optical distance compensation device, a spot transformation device, a spot reflecting device and N output ports. The input port and output port are usually fiber array collimators. The light splitting device consists of 50:50 splitter and a plurality of reflectors. With reasonable choice of size and position of those devices, any input signal light can be splitted i into N beams of sub-signal light, then getting signal light with distribution of M×N matrix. The light splitting device can be designed as integrated structure, which can split the M beams of input signal light at same time. The spot transformation device is composed of lens, the M×N beams of parallel light with matrix distribution are converged into 1×n parallel spots, each of which is generated from converging of a beam of the sub-signal light. The reflectors are 1×n MEMES reflectors array, each of the reflectors is independent and adjustable, through which the sub-signal light beams are select from the input signal light beams, and output to N output ports.

Embodiment of the present invention provided a multicast optical switch based on free-space transmission, comprising: a 1×M input collimator array (10), a light splitting device (20), an optical distance compensation device (70), a spot transformation device (30), a 1×N output collimator array (50), and a reflector array (40) arranged sequentially, wherein the 1×N output collimator array (50) corresponds to the reflector array (40), the light splitting device (20) is provided with a splitting surface and a reflecting surface causing input signal light of the 1×M input collimator array (10) being subjected to n (n≥2) times of light splitting and beam splitting to generate $N=2^n$ beams of sub-signal light;

wherein the optical distance compensation device (7) compensate optical distance difference among M×N sub-signal beams generate from the light splitting device (20);

wherein the spot transformation device (30) focus the M×N sub signal beam into 1×N light spots which are incident on the reflector array (40).

According to an embodiment of the present invention, splitting surface of the light splitting device (20) is 50:50 polarization-independent splitter (21), the reflecting surface include two reflective mirrors disposed on both sides of the splitter (21).

According to an embodiment of the present invention, the light splitter (21) uses a light splitting film or light splitting plate.

According to an embodiment of the present invention, the light splitting device (20) is a special-shaped light splitting prism (60), which includes light splitting surface (61) with function of light splitting surface, and edge surfaces (62 and 63) with function of reflective surface.

According to an embodiment of the present invention, the spot transformation device (30) includes a first lens (31), a second lens (32), and a third lens (33) arranged sequentially, wherein the first lens (31) and the third lens (33) are cylindrical lenses on x-direction, the second lens (32) is a cylindrical lens on y-direction.

According to an embodiment of the present invention, the optical distance compensation device (70) is consist of a set of glass blocks (701~715), each of which is set correspondingly in optical path of each sub-signal beam, length of the glass block is $$d_i = \frac{\Delta L_i}{(n_1 - 1)},$$

wherein $\Delta L_i$ is optical distance difference between $i^{th}$ beam of sub-signal light and sub-signal beam with longest optical distance, $n_1$ is refractive index of the glass blocks.

According to an embodiment of the present invention, the reflector array (40) is two-dimensional 1×N MEMS reflectors array.

According to an embodiment of the present invention, the reflector array (40) is provided with a interference preventer in front thereof, which includes a focus-backward device (35), a $5^{th}$ reflector (36) and a shield plate (37); the $5^{th}$ reflector (36) is set in rear end of the focus-backward device (35) to reflect position of light focus point to a focal plane (90) without the focus backward device (35) set in optical path, and the reflector array (40) is also disposed in the focus point, the shield plate (37) is disposed between the spot transformation device (30) and the reflector array (40).

According to an embodiment of the present invention, the shield plate (37) is reflective or non-transmissive plate.

The focus-backward device (35) is a glass plate.

Embodiments of the present invention have the advantages of compact structure, simple assembly and low cost, and fully realize requirements of colorlessness, non-directionality and non-competitiveness.

Figure 1:
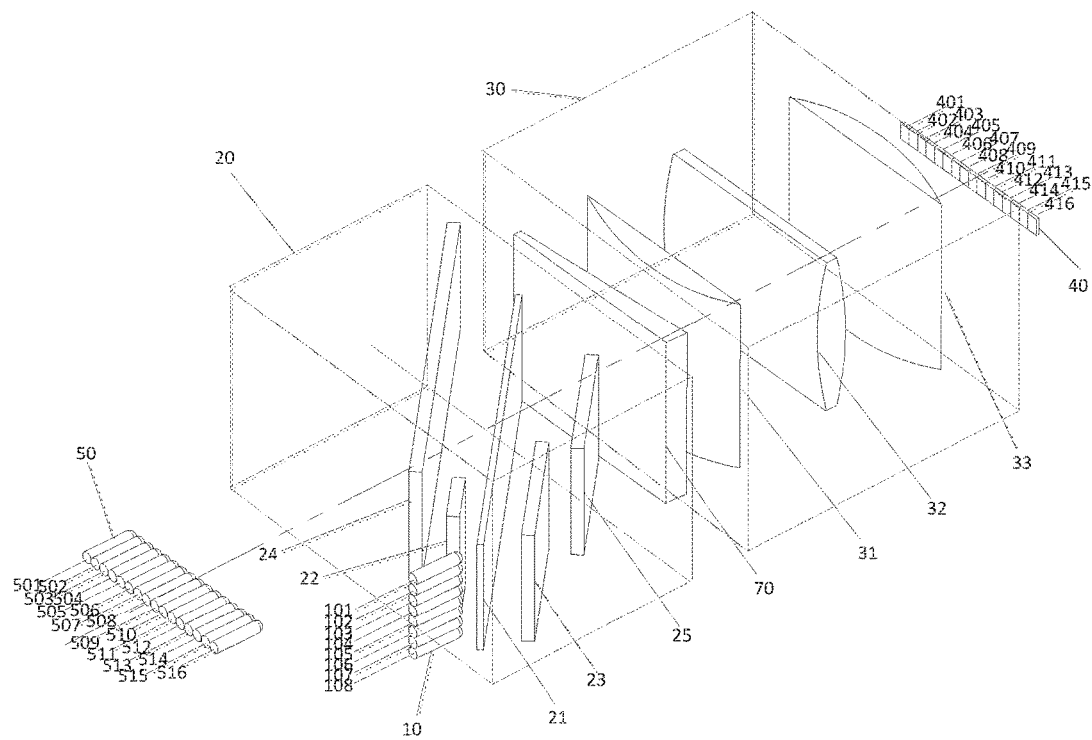
FIG. 1 shows overall structure of a multicast optical switch of a first embodiment of the present invention.

In the Figures:
10: input collimator array
20: light splitting device
70: optical distance compensation device
30: spot transformation device
40: reflector array
50: output collimator array
21: light splitter
22: first reflector
23: second reflector
24: third reflector
25: fourth reflector
31: first lens
32: second lens
33: third lens
34: refraction prism
35: focus-backward device
36: the fifth reflector
37: shield plate
101~108: the input collimator of input collimator array 10
201, 202, 203, 205: optical signal beam passed through splitter 21
60: special-shaped light splitting prism
62, 63: edge surface of special-shaped light splitting prism 60
401~416: reflectors composing reflector array
501~516: output collimator of collimator array 50
701~715: glass block
61: light splitting surface of special-shaped light splitting prism 60
601: incidence signal
602, 603, 605: sub-signal light beam passing through special-shaped light splitting prism 60
90: focal plane
91: backward focal plane

EMBODIMENTS

Embodiments of the present invention will be described in greater detail with reference to the examples and the drawings.

FIG. 1 shows overall structure of a multicast optical switch of an embodiment of the present invention. As shown in the figure, the structure thereof comprises 1×M input collimator array 10, a light splitting device 20, an optical distance compensation device 70, a spot transformation device 30, a reflector array 40 and 1×N output collimator array 50. The 1×N output collimator array 50 corresponds to the reflector array 40, and is located on same side with the 1×M input collimator array 10. The light splitting device 20 is provided with a splitting surface and a reflecting surface causing input signal light of the 1×M input collimator array (10) being subjected to n (n≥2) times of light splitting and beam splitting to generate N=$2^n$ beams of sub-signal light. An example of the light splitting device 20 of the embodiment of the present invention comprises splitter 21, a first reflector 22, a second reflector 23, a third reflector 24, and a fourth reflector 25, The first reflector 22 and the second reflector 23 are respectively located at each side of the splitter 21. The third reflector 24 is located at another side of the first reflector 22; the fourth reflector 25 is located at another side of the second reflector 23. The spot transformation apparatus 30 comprises a first lens 31, a second lens 32 and a third lens 33, which are arranged sequentially. The signal light input from any one collimator of the input collimator array 10 can passes through the device and then can be outputted from any one or more of unoccupied collimators in the output collimator array 50, or there is no output. Each collimator of the output collimators 501~506 can select input light signal from one port of the input collimators 101~108 at most.

In device of the embodiment of the present invention, the 1×M input collimator array 10 have M input ports, wherein M is one or above; the 1×N output collimators array 50 have N output ports, wherein N is bigger than one. Function of the light splitting device 20 is to split each beam of input signal light from the M input ports into N sub-signal light beams and then yield total of M×N beams of sub-signal light. The optical distance compensation device 70 is to compensate optical distance difference among the M×N beams of sub-signal light generated from the light splitting device. The spot transformation device 30 is to converge the M×N beams of sub-signal light obtained from the light splitting device into 1×N spots, in which each of N spots is converged from a beam of sub-signal light of the M beams of input signal light, and transmit into the reflectors. The reflector, that is, the reflector array 40, can be adjusted to enable each port of the N output ports to receive sub-signal light beam generated from any input port of the M input ports, or there is no light beam.

Figure 2A:
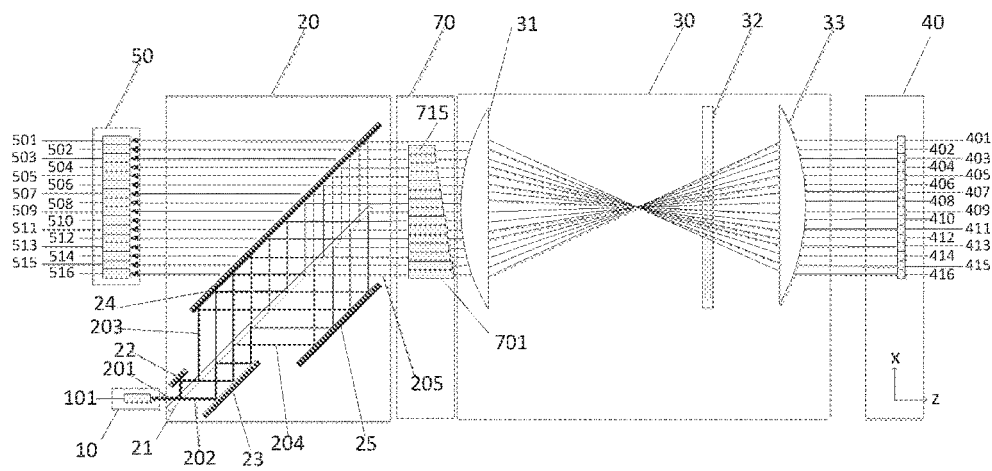
FIG. 2a shows top view of the structure of the multicast optical switch of the first embodiment of the present invention.
Figure 2B:
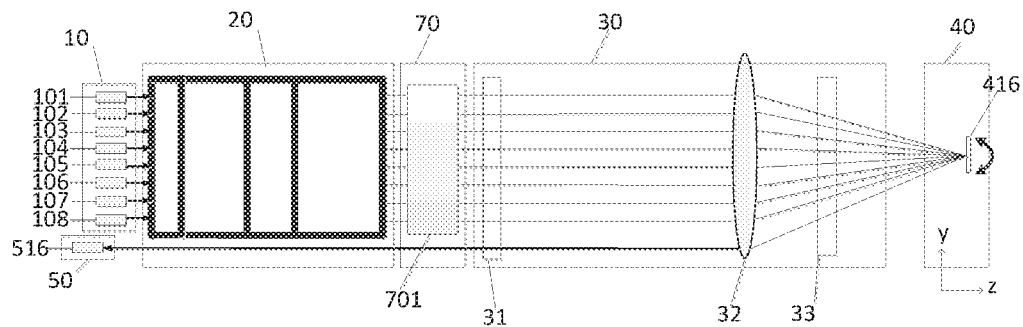
FIG. 2b shows side view of the structure of the multicast optical switch of the first embodiment of the present invention.

FIG. 2a and FIG. 2b are respectively top and side views of the multicast optical switch of an embodiment of the present invention. For illustration, throughout the system, incident direction of the light is defined as Z axis, arrangement direction of the input collimator array 10 is defined as Y axis, and arrange direction of output collimator array 50 is defined as X axis.

The light splitting device 20 is then described with reference to accompanying figures. As shown in FIG. 2a, the signal beam 201 is considered as an example. The signal light 201 is incident from the input collimator 101 on the top to splitter 21 of the light splitting device 20. The input signal light 201 with a intensity is incident onto the 50:50 polarization-independent splitter 21. Here, the splitter 21 can be a beam splitting film or beam splitting plate. The input signal light 201 is splitted into two beams of signal light 202 with ½ intensity, which are reflected by the first reflector 22 and the second reflector 23 respectively and then pass through the 50:50 polarization-independent splitter 21 again, and are then splitted into four beams of signal light 203 with ¼ intensity. Similarly, by using the second reflector 23, the third reflector 24 and the fourth reflector 25 or more reflectors, signal light can be splitted by the 50:50 polarization-independent splitter 21 for n (n≥2) times in above manner, and then N=2$^n$ beams of the sub-signal light with ½ intensity can be generated. It will be understood by those skilled in the art that by increasing or decreasing the number of the reflectors, number of times that signal light passes through the splitter 21 can be controlled, and eventually the number and intensity of splitted beams can be controlled. By adjusting positions of the reflectors in the light splitting device 20, the distance and position of the outgoing sub-signal light can be controlled. In addition, by calculating, some splitted sub-signal light can share one reflector to decrease the number of reflectors, simplify structure and save costs.

Optical distance difference can arise, because each beam in the light splitting device 20 does not go through with same track. Therefore, a optical distance compensation device 70 is set near the light splitting device 20. The optical distance compensation device 70 comprises a set of glass block 701~715, length of each of which is determined by optical distance difference of each splitted beam of sub-signal light in direction of the X axis. Let optical distance difference between i$^{th}$ sub-signal beam and optical distance of sub-signal beam with longest optical path is $\Delta L_i$, then the length of the glass block on the optical path of the i$^{th}$ beam of sub-signal light is $$d_i = \frac{\Delta L_i}{(n_1 - 1)}.$$

As shown in FIG. 2b, each of M beams of incidence signal light input from input collimator array 10 can pass through the light splitting device 20 and optical distance compensation device 70. In this way, the M beams of incident signal light will form two-dimensional M×N beams of sub-signal light, which are parallel to each other, with equal optical distance, and with arrangement directions parallel to x axis and y axis respectively.

The spot transformation device 30 in embodiment of the present invention comprises three lenses of the first lens 31, the second lens 32 and the third lens 33 arranged sequentially. The first lens 31, the second lens 32 and the third lens 33 can be cylindrical lenses. As shown in FIG. 2a and FIG. 2b, the first lens 31 and the third lens 33 are cylindrical lenses on x direction, which has focusing effect only on beams arranged on x direction. The second lens 32 is a cylindrical lens on y direction, which has focusing effect only on beams arranged on y direction. The M×N beams of sub-signal light produced by light splitting device 20 will be focused into 1×N spots arranged in x direction in XZ plane after passing through the spot converting device 30, and the spots are on N reflectors 401~416 of the reflector array 40 respectively. The reflector array 40 can be MEMS reflector. Each spot is generated by focusing all of the M sub-signal light in the same YZ plane. Each reflector of the reflector array 40 is able to rotate around X axis and Y axis. By rotating around X axis, a particular beam of M beams of the sub-signal light can be reflected back to the spot transformation device 30, and exit below the light splitting device 20 and the optical distance compensation device 70, and is received by output collimator array 50. When rotating around x axis, in order to achieve lossless switch, the reflector is required to rotate around Y-axis first, and then rotate around X-axis, and rotate around Y-axis at last. Those skilled in this art will understand that by increasing the coupling angle of non-selective signal light and output port, coupling degree between non-selective signal light and output port can be reduced. By adjusting reflector array 40, each port of the N y-direction output ports can receive beams of sub-signal light produced by any one input port of the M input ports, or there is no beam. As shown in FIG. 2a, at last, spot reflected back by reflectors 401~416 pass through spot transformation system again, and can be received by output collimators 516~501 respectively.

As shown in FIG. 2a, an example of the light splitting device 20 in embodiment of the present invention uses four reflectors, namely, the first reflector 22, the second reflector 23, the third reflector 24, and the fourth reflector 25, which enable that after the signal light passes through the 50:50 polarization-independent splitter 21 four times, 16 beams of signal light 205 with 1/16 intensity are generated. As shown in FIG. 2b, eight optical fiber collimators are used in y direction to form the input collimator array 10. Therefore, eight beams of input signal light produce 8×16 matrix spot after passing through the light splitting device 20.

As shown in FIG. 2a, an example of the light splitting device 20 in embodiment of the present invention uses beam splitting film as splitter 21. Since thickness of the splitting film is at micron level, and can be 2 micrometers here, nearly no displacement will appear after the signal light passes through the beam splitting film. In this way, it makes intervals between 16 beams of signal light equal by using the four reflectors. So a design with equal-space between lenses in reflector array 40 can be applied. If a beam splitter plate is used as the splitter 21, the thickness of the beam splitter plate itself will have a displacement effect on signal light. Those skilled in this art will understand that it will make the interval between splitted beams unequal, thus will affect reception of reflector array 40 in next stage of the entire system. There are two solutions to this problem. Firstly, the lenses of reflector array 40 are designed with different intervals so as to match the splitted beams with different intervals; Secondly, more reflectors can be used to adjust the intervals between splitted beams to make the intervals equal.

Figure 3:
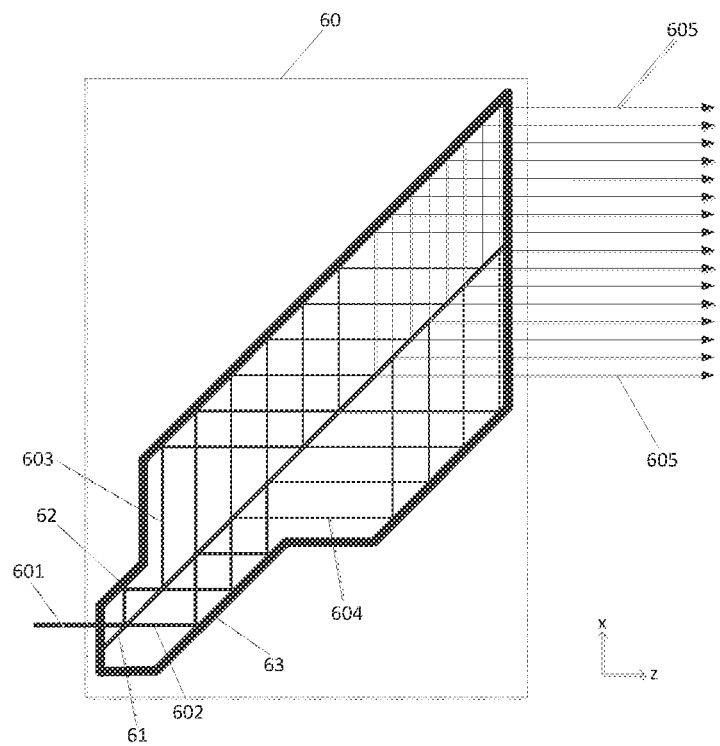
FIG. 3 shows splitting structure realized by using special-shaped light splitting prism, according to a second embodiment of the present invention.

FIG. 3 shows another implementation of the light splitting device 20, which is a special-shaped light splitting prism 60. Here, the special-shaped light splitting prism 60 is used to split beams. The special-shaped light splitting prism 60 includes a light splitting surface 61 with function of light splitting surface, and an edge surfaces 62 and 63 with function of reflective surface. When incident signal 601 with intensity of 1 transmit on the light splitting surface 61 of the special-shaped light splitting prism 60, it is split into two beams of sub-signal light 602 with intensity of ½. Each signal light with ½ intensity is subjected to total reflection on edge surfaces 62 and 63 of the special-shaped light splitting prism respectively, and then pass through the light splitting surface 61 again to be splitted into 4 beams of sub-signal light 603 with intensity of ¼. Similarly, by controlling the shape of the edge of the special-shaped light splitting prism, it produces multiple times of total reflection on edge surfaces, then the signal light is subjected to n (n≥2) times of light splitting by light splitting surface to generate $2^n$ beams of signal light with $½^n$ intensity. The structure shown in the figure is able to split each beam of input signal light into 16 beams of sub-signal light 605 with equal power and same interval. The special-shaped light splitting prism can be get from cutting conventional light splitting prism, the edges of which can act with the function of reflector in the above example. Advantage thereof is that it is not needed to adjust each optical device reflectivity, and reflectivity of total reflection is higher than that of reflector. Those skilled in this art will understand that since edges of the prism is similar to the reflector in the first light splitter, the shape of the special-shaped light splitting prism can be adjusted according to the number and position of splitting.

Figure 4:
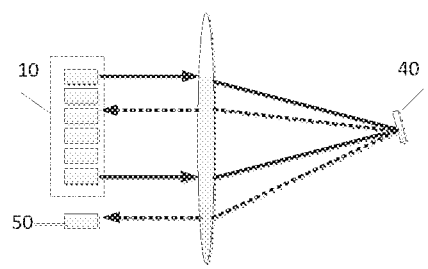
FIG. 4 shows inter-ports interfere of the device according to an embodiment of the present invention.
Figure 5:
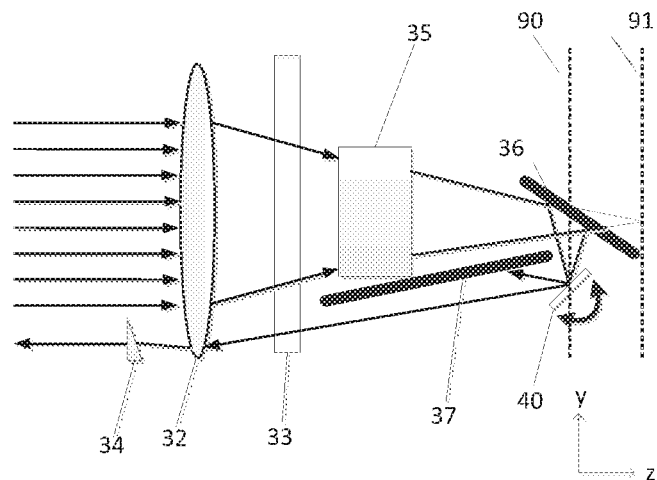
FIG. 5 shows side view of structure of reflect-backward device after adding an anti-interference structure, according to an embodiment of the present invention.

As shown in FIG. 2b, to decrease the size and cost of the device, the size of the lenses may be as small as possible, and the output collimator array 50 and input collimator array 10 may be as near as possible. It causes a problem that in simplified structure shown in FIG. 4, when rotating reflector array 40 to select a required beam of input light signal to be transmitted to the output collimator array 50, part of reflected light from other channels will be reflected into some ports of the input collimator array 10 and cause interference in those ports. To avoid such interference, embodiment of the invention provides another way to improve it. As shown in FIG. 5, an interference preventer is added in front of reflector array 40. The interference preventer comprises a focus-backward device 35, the fifth reflector 36 and shield plate 37. Here, focus-backward device 35 can be a glass plate. A glass plate with thickness of d and refractive index of $n_2$ is set behind the spot transformation device 30 as the focus-backward device 35, and the focal plane of image side of the second lens 32 is moved frontward and backward for distance of $L_{shift}=d-d/n_2$ to the position as indicated by the moved-backward focal plane 91. The 5th reflector 36 is to reflect the position of light convergent point on the focal plane 90 without disposed focus-backward device 35, and the reflector array 40 is set on the convergent point. In this way, when the light is reflected by the MEMS, it is still on the focal plane of the lens. The shield plate 37 is disposed between the spot transformation device 30 and the reflector array 40. The shield plate 37 is reflective or non-transmissive plate, such as plastic plate. It can prevent beams of the signal light that are not chosen from being reflected into spot transformation device, thus avoid them from being reflected into incident ports. The refraction prism 34 in front of the second lens 32 is set between output collimator 50 and the second lens 32. The refraction prism 34 here is to let the reflected and chosen signal light parallel to Z axis after passing through the second lens 32 and refraction prism 34, so as to make output signals with output collimator array 50 coupled.

Mentioned above are only a few embodiment examples of the invention. Though specific and detailed in description, they should not thereby be understood as limitations to the application scope of this invention. What should be noted is that, possible variations and modifications developed by ordinary technicians in this field, without departing from the inventive concept of this invention, are all covered in the protection scope of this invention. Thus the protection scope of this invention should be subject to the appended Claims.

What is claimed is:

1. A multicast optical switch based on free-space transmission, comprising: a 1×M input collimator array, a light splitting device, an optical distance compensation device, a spot transformation device, a 1×N output collimator array, and a reflector array arranged sequentially, wherein the 1×N output collimator array corresponds to the reflector array, the light splitting device is provided with a splitting surface and a reflecting surface for causing input signal light of the 1×M input collimator array being subjected to n (n≥2) times of light splitting and beam splitting to generate $N=2^n$ beams of sub-signal light;

wherein the optical distance compensation device is for compensating optical distance difference among M×N beams of sub-signal light generate from the light splitting device;

wherein the spot transformation device is for focusing the M×N beams of the sub-signal light into 1×N light spots which are incident on the reflector array.

2. The multicast optical switch based on free-space transmission of claim 1, wherein splitting surface of the light splitting device is a 50:50 polarization-independent splitter, the reflecting surface include two reflective mirrors disposed on both sides of the splitter.

3. The multicast optical switch based on free space transmission of claim 2, wherein the reflector array is provided with an interference preventer in front thereof, which includes a focus-backward device, a fifth reflector and a shield plate;

wherein the fifth reflector is set in rear end of the focus-backward device to reflect position of light focus point to a focal plane without the focus backward device set in optical path, and the reflector array is also disposed in the focus point, the shield plate is set between the spot transformation device and the reflector array.

4. The multicast optical switch based on free space transmission of claim 2, wherein the light splitter uses a light splitting film or light splitting plate.

5. The multicast optical switch based on free space transmission of claim 4, wherein the reflector array is provided with an interference preventer in front thereof, which includes a focus-backward device, a fifth reflector and a shield plate;

wherein the fifth reflector is set in rear end of the focus-backward device to reflect position of light focus point to a focal plane without the focus backward device set in optical path, and the reflector array is also disposed in the focus point, the shield plate is set between the spot transformation device and the reflector array.

6. The multicast optical switch based on free space transmission of claim 1, wherein the light splitting device is a special-shaped light splitting prism, which includes light splitting surface with function of light splitting surface, and edge surfaces with function of reflective surface.

7. The multicast optical switch based on free space transmission of claim 6, wherein the reflector array is provided with an interference preventer in front thereof, which includes a focus-backward device, a fifth reflector and a shield plate;

wherein the fifth reflector is set in rear end of the focus-backward device to reflect position of light focus point to a focal plane without the focus backward device set in optical path, and the reflector array is also disposed in the focus point, the shield plate is set between the spot transformation device and the reflector array.

8. The multicast optical switch based on free space transmission of claim 1, wherein the spot transformation device includes a first lens, a second lens, and a third lens arranged sequentially, wherein the first lens and the third lens are cylindrical lenses on x-direction, the second lens is a cylindrical lens on y-direction.

9. The multicast optical switch based on free space transmission of claim 8, wherein the reflector array is provided with an interference preventer in front thereof, which includes a focus-backward device, a fifth reflector and a shield plate;

wherein the fifth reflector is set in rear end of the focus-backward device to reflect position of light focus point to a focal plane without the focus backward device set in optical path, and the reflector array is also disposed in the focus point, the shield plate is set between the spot transformation device and the reflector array.

10. The multicast optical switch based on free space transmission of claim 1, wherein the optical distance compensation device is consist of a set of glass blocks, each of which is set correspondingly in optical path of each beam of sub-signal light, wherein length of the glass block is $$d_i = \frac{\Delta L_i}{(n_1 - 1)},$$

wherein $\Delta L_1$ is optical distance difference between $i^{th}$ beam of sub-signal light and beam of sub-signal light with longest optical distance, $n_1$ is refractive index of the glass blocks.

11. The multicast optical switch based on free space transmission of claim 10, wherein the reflector array is provided with an interference preventer in front thereof, which includes a focus-backward device, a fifth reflector and a shield plate;

wherein the fifth reflector is set in rear end of the focus-backward device to reflect position of light focus point to a focal plane without the focus backward device set in optical path, and the reflector array is also disposed in the focus point, the shield plate is set between the spot transformation device and the reflector array.

12. The multicast optical switch based on free space transmission of claim 1, wherein the reflector array is two-dimensional 1×N MEMS reflectors array.

13. The multicast optical switch based on free space transmission of claim 12, wherein the reflector array is provided with an interference preventer in front thereof, which includes a focus-backward device, a fifth reflector and a shield plate;

wherein the fifth reflector is set in rear end of the focus-backward device to reflect position of light focus point to a focal plane without the focus backward device set in optical path, and the reflector array is also disposed in the focus point, the shield plate is set between the spot transformation device and the reflector array.

14. The multicast optical switch based on free space transmission of claim 1, wherein the reflector array is provided with an interference preventer in front thereof, which includes a focus-backward device, a fifth reflector and a shield plate;

wherein the fifth reflector is set in rear end of the focus-backward device to reflect position of light focus point to a focal plane without the focus backward device set in optical path, and the reflector array is also disposed in the focus point, the shield plate is set between the spot transformation device and the reflector array.

15. The multicast optical switch based on free space transmission of claim 14, wherein the shield plate is reflective or non-transmissive plate.

16. The multicast optical switch based on free space transmission of claim 15, wherein the focus-backward device is a glass plate.

* * * * *